July 17, 1934.  A. J. E. ROUALET  1,966,599

SNAP-ON BEARING CLIP

Filed Jan. 3, 1933

INVENTOR.
ANDRE J. E. ROUALET.
BY
ATTORNEYS.

Patented July 17, 1934

1,966,599

UNITED STATES PATENT OFFICE 1,966,599

SNAP-ON BEARING CLIP

Andre J. E. Roualet, Detroit, Mich., assignor to Chrysler Corporation, Detroit, Mich., a corporation of Delaware Application January 3, 1933, Serial No. 649,920

4 Claims. (Cl. 287—93)

This invention relates to an improved clip and particularly to a bearing clip for guiding the movements of a pair of interfitting relatively pivotal members and holding such members against separation.

The main objects of the invention are to provide a device of this character which is detachably securable to one of a pair of interfitting relatively pivotal members by a snap-on action; to provide a resilient gripping element on a bearing clip which will withstand repeated attachment thereof to and detachment from said member; to provide a thrust bearing element on a clip of this character for yieldably holding all but the interfitting portions of the relatively pivotal members against contacting with each other; and to provide a pair of such thrust bearing elements on a clip of this character which are engageable with respectively opposite sides of one member and adapted to prevent separation thereof from the member on which the clip is mounted.

Further objects of the invention are to provide a bearing clip which is adapted to releasably hold a bent end portion of a rod in journaled relation in an aperture of a lever without the aid of a cotter pin or other means requiring the formation of apertures in or threads on the bent end portion of the rod; to provide means on a clip of this kind which confines the lever to rotation in a plane substantially normal to the axis of the bent end portion of the rod and which prevents the elbow-like junction between the bent end portion thereof and the main length of the rod from entering and binding in the aperture of the lever; to provide a bearing clip which may be conditioned to limit the rotation of the lever relative to the rod to a predetermined range of angular movement; and to provide an inexpensive clip of this kind for maintaining a rod and lever in pivotally joined relation which effects a substantial saving in time and labor over that required during the production and assembly of such parts of a mechanism in a conventional manner, such as by means of washers and cotter pins.

An illustrative embodiment of the invention is shown in the accompanying drawing, in which.

Figure 4:
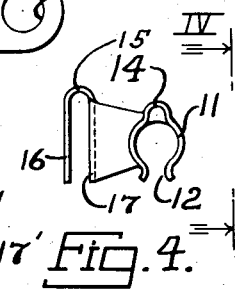
Fig. 4 is an end elevational view of the clip taken on the line IV—IV of Fig. 3.
Figure 3:
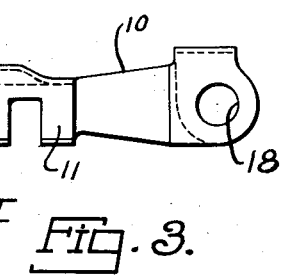
Fig. 3 is a side elevational view of the bearing clip shown in Figs. 1 and 2.

The bearing clip embodying the form of my invention shown in Figs. 1 to 4, inclusive, is preferably formed of resilient sheet metal, such as spring steel, and it includes a body portion 10 having a snap-on fastening element 11 on one end which is yoke shaped in cross section, as illustrated in Fig. 4. The fastening element 11 is provided with a restricted open edge 12 for receiving a rod 13 or other similar part of a mechanism. The side portions of the fastening element 11 are flared outwardly at the open edge 12 thereof so as to enable the fastening element to be snapped upon the rod. Formed at the outer end portion of the fastening element 11 is an abbreviated hollow bead 14 which is located substantially diametrically opposite from the open edge 12. This bead is provided to enable the insertion of a tool between the fastening element 11 and the rod 13 for the purpose of removing the clip.

Formed on the opposite end of the body portion 10 of the clip is a thrust bearing yoke 15 of substantially U-shaped cross section which has spaced side portions 16 and 17 provided with registering apertures 18. The bearing yoke 15 is offset with respect to the snap-on fastening element 11 and it is constructed and arranged in such a manner as to permit the registering apertures 18 of the yoke 15 to accommodate a bent end portion 19 of the rod 13 on which a lever 20 is journaled. The lever 20 has an aperture (not shown) through which the end portion 19 of the rod extends, and this lever is disposed between the sides 16 and 17 of the yoke 15. The bearing clip is preferably brought into assembled relation with the pivotally associated members 13 and 20, shown in Fig. 1, by first inserting the apertured end of the lever 20 between the sides 16 and 17 of the yoke and bringing the aperture of the lever into registration with the apertures of the yoke. Then the end portion 19 of the rod 13 is extended through the registering apertures of the yoke and lever and the clip is rotated relative to the rod in that direction which brings the outwardly flared edges of the sides of the fastening element 11 into contact with the rod 13. Slight pressure applied by hand or with the aid of a pair of pliers is applied on the fastening element 11 so as to spread the sides thereof apart sufficiently to admit the rod. The sides of the fastening element then resiliently embrace the rod in a clamping manner, thereby releasably holding the bearing clip against displacement.

When a device of this construction is employed, the lever is held in a predetermined plane relative to the axis of the bent edge portion of the rod 19 and the latter is prevented from being withdrawn from the aperture of the lever and the lever is held against movement toward the elbow portion 21 of the rod where binding of the lever tends to occur. The rod and lever are therefore held in a selected pivotally associated relation without the aid of washers, nuts, or cotter pins which require expensive drilling or threading operations.

In the form of the invention shown in Figs. 5 to 8, inclusive, my improved detachable clip is provided with only one thrust bearing element which is adapted to yieldably hold one of a pair of interfitting pivotally associated parts of a mechanism from shifting in one direction relative to the other. This bearing clip includes a body portion 22 which is preferably formed of resilient sheet metal such as spring steel. Provided on one end of the body portion 22 is a bearing element 23 having an aperture 24 therein for receiving a bent end portion 25 of a rod 26. Formed on the other end of the body portion 22 of the clip is a snap-on fastening element 27 having an open edge 28 accessible from the same side of the clip as the aperture 24. This bearing clip is preferably mounted on the rod before the latter is connected with the part of a mechanism with which it cooperates by inserting the bent end portion 25 of the rod through the aperture 24 while the open edge of the fastening element 27 is adjacent the rod. The clip is then moved toward the rod and the fastening element 27 is pressed thereon, either by hand or with the aid of pliers. After the bearing clip is mounted on the rod in this manner the bent end portion of the rod is extended through the aperture of a lever 29 or other similar part of a mechanism and a washer 30 is mounted upon the bent end portion of the rod adjacent the side of the lever which is remote from the thrust bearing element 23. A cotter pin 31 is then passed through an aperture in the bent end portion of the rod so as to prevent displacement of the washer 30 and lever 29 from the latter.

Figure 5:
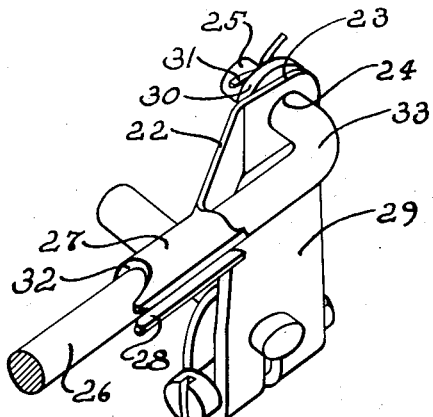
Fig. 5 is a fragmentary perspective view of a pair of pivotally associated parts of a mechanism showing a bearing clip embodying a modified form of my invention also in perspective.
Figure 1:
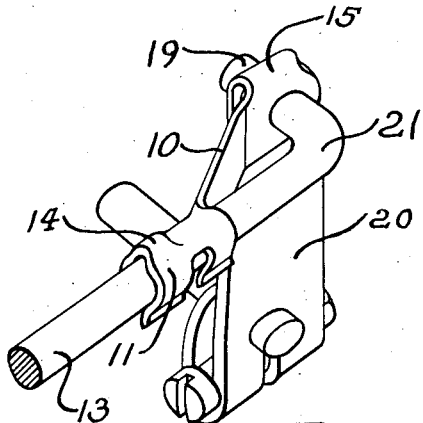
Fig. 1 is a fragmentary perspective view of a pair of pivotally associated parts of a mechanism showing my improved snap-on detachable bearing clip also in perspective.
Figure 6:
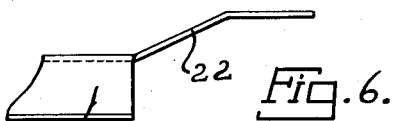
Fig. 6 is a plan view of the bearing clip shown in Fig. 5.
Figure 2:
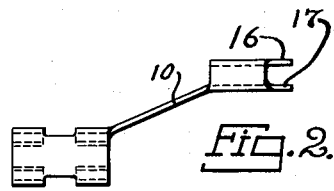
Fig. 2 is a plan view of the bearing clip illustrated in Fig. 1.
Figures 7, 8:
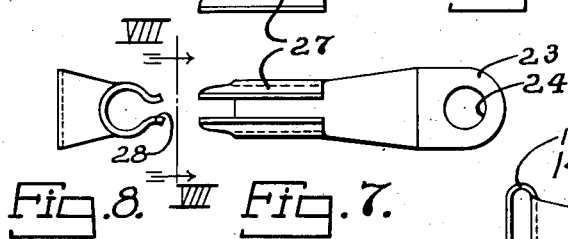
Fig. 7 is a side elevational view of the bearing clip shown in Figs. 5 and 6.
Fig. 8 is an end elevational view showing the bearing clip as it appears from a plane designated by the line VIII—VIII in Fig. 7.

The outer end portion of the fastening element is cut away, as illustrated at 32 in Fig. 5, so as to permit removal of the clip from the rod by bringing one of the jaws of a pair of pliers into contact with the rod and the other jaw thereof into contact with the edges of the sides of the fastening element located at the open edge thereof. The application of pressure upon the rod and such edge portions of the sides of the fastening element from diametrically opposite directions causes the rod to be forced through the restricted open edge of the fastening element.

The bearing clip illustrated in Figs. 5 to 8, inclusive, is not adapted to independently hold the rod and lever in a pivotally associated relation but it may be relied upon to prevent shifting of the lever relative to the bent end portion of the rod in such a manner as to bring the elbow portion 33 of the rod into the aperture of the lever and in this way binding between the lever and the elbow portion of the rod is prevented. The clip may also be conditioned so as to yieldably urge the bearing element 23 thereof against one side of the lever so as to maintain the latter in a plane substantially perpendicular to or at any desired relation to the axis of the bent end portion of the rod.

Figure 9:
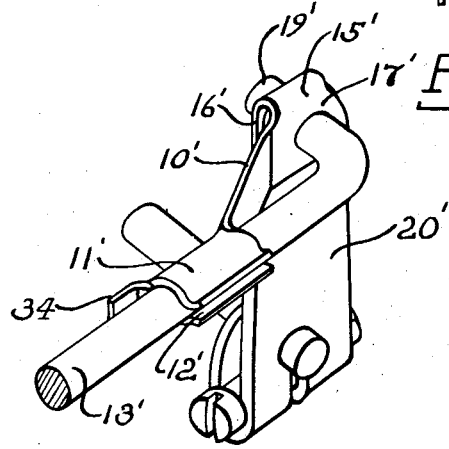
Fig. 9 is a perspective view of a pair of pivotally associated parts of a mechanism showing a bearing clip embodying a still further development of the invention also in perspective.

The bearing clip shown in Fig. 9 is similar to the clip illustrated in Figs. 1 to 4, inclusive. The main difference between these two forms of my invention lies in the relative locations of the open side of the fastening element and the registering apertures through which the bent end portion of the rod extends. In the form shown in Fig. 9 the bearing clip has a body portion 10' which is provided at one end with a fastening element 11' and at its other end with a bearing yoke 15'. The sides 16' and 17' of the bearing yoke are provided with registering apertures which are accessible from the same side of the clip as the open edge portion 12' of the fastening element 11'.

In securing a pair of pivotally associated parts of a mechanism together with a bearing clip of this character an apertured part, such as the lever 20', is placed between the sides 16' and 17' of the yoke 15' with its aperture in registration with the apertures of the yoke. Then the bent end portion 19' of the rod 13' is inserted through these apertures from the side of the clip on which the open edge portion 12' of the fastening element is located. The rod 13' is then forced through the restricted open edge of the fastening element and into the space between the sides thereof. With this form of my invention the looped or closed edge portion of the yoke 15' may be relied upon to limit rotation of the lever 20' relative to the rod 13' in respectively opposite directions without danger of unintentionally disengaging the fastening element from the rod by the pivotal movement of the lever relative thereto. The fastening element 11' may be detached from the rod by inserting a screw driver or other similar tool between the rod and a protruding ear 34 on the outer extremity of the element 11'.

Although but several specific embodiments of my invention are herein shown and described, it will be understood that various changes in the size, shape, and arrangement of parts may be made without departing from the spirit of my invention, and it is not my intention to limit its scope other than by the terms of the appended claims.

What I claim is:

1. The combination of a pair of pivotally associated parts of a mechanism, one having an aperture therein and the other having an elbow with a journal portion extending through said aperture, and a clip having a snap-on fastening element detachably embracing the part carrying said journal portion and having a pair of united thrust bearing elements, one located on each side of said apertured part respectively, said bearing elements constituting the sole means for positioning and maintaining said apertured part at a predetermined location on said journal portion spaced from said elbow.

2. In combination, a pair of pivotally associated parts of a mechanism, one having an aperture therein and the other having a journal portion extending through said aperture, and a bearing clip including a spring metal body portion having a snap-on fastening element embracing said latter part and including a yoke having a bridge and integral spaced side elements, one located on each side of said apertured part respectively and provided with registering apertures for receiving said journal portion, said yoke constituting the sole means for positioning and maintaining said journal portion at a predetermined location relative to its associated part, and said bridge being constructed and arranged to limit relative rotation of said apertured part.

3. The combination of a pair of pivotally associated parts of a mechanism, one having an aperture therein and the other having an angularly disposed journal portion extending through said aperture, and a bearing clip including a resilient metal body portion having a yoke on one end provided with spaced sides for receiving said apertured part and provided with apertures for receiving said journal portion, and including a yoke-shaped fastening element offset with respect to said first mentioned yoke and having a constricted open side in a plane disposed in non-parallel relationship to the pivotal axis of said parts for receiving a portion of the part carrying said journal portion, the spaced sides of said first mentioned yoke being provided with a connecting bridge adapted to limit relative rotation of said parts.

4. In combination, a pair of pivotally associated parts of a mechanism, one having an aperture therein and the other having a journal portion extending through said aperture, and a bearing clip including a metal body portion having means for detachably securing said bearing clip to one of said parts, and a yoke at one end of said clip provided with spaced sides for receiving said apertured part and provided with apertures for receiving said journal portion, the spaced sides of said yoke having a connecting bridge adapted to limit relative rotation of said pivotally associated parts.

ANDRE J. E. ROUALET.